(12) United States Patent
Barbieri et al.

(10) Patent No.: US 9,219,571 B2
(45) Date of Patent: Dec. 22, 2015

(54) APERIODIC CQI REPORTING IN A WIRELESS COMMUNICATION NETWORK

(75) Inventors: Alan Barbieri, San Diego, CA (US); Tingfang Ji, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 13/085,371

(22) Filed: Apr. 12, 2011

(65) Prior Publication Data

US 2011/0249584 A1 Oct. 13, 2011

Related U.S. Application Data

(60) Provisional application No. 61/323,824, filed on Apr. 13, 2010.

(51) Int. Cl.
*H04W 24/00* (2009.01)
*H04W 4/00* (2009.01)
*H04L 12/26* (2006.01)
*H04L 1/00* (2006.01)
(Continued)

(52) U.S. Cl.
CPC ............ *H04L 1/0026* (2013.01); *H04L 1/0027* (2013.01); *H04W 28/04* (2013.01); *H04W 48/08* (2013.01); *H04W 72/00* (2013.01); *H04W 72/0413* (2013.01); *H04W 72/082* (2013.01); *H04W 72/085* (2013.01)

(58) Field of Classification Search
CPC ... H04L 1/0026; H04L 5/0057; H04L 5/0053; H04L 1/0027; H04B 17/0042; H04B 17/0067; H04W 24/10; H04W 28/04; H04W 72/085; H04W 72/00; H04W 72/0413; H04W 72/082; H04W 72/08

USPC ................. 370/241–248, 251–253, 328–338; 455/115.1–115.4, 226.1–227
See application file for complete search history.

(56) References Cited

U.S. PATENT DOCUMENTS 5,020,056 A * 5/1991 Chennakeshu ................ 370/347
5,995,498 A * 11/1999 Toot et al. ..................... 370/332
(Continued)

FOREIGN PATENT DOCUMENTS

CN          1153498 C       6/2004
CN          101268711 A     9/2008
(Continued)

OTHER PUBLICATIONS

Huawei,R1-084352 "Some results on DL coordinated beam switching for interference management in LTE—Advanced" Nov. 2008.*
(Continued)

*Primary Examiner* — Thai Hoang
*Assistant Examiner* — Kenneth P Hunt
(74) *Attorney, Agent, or Firm* — Tyler J. Overall

(57) ABSTRACT

According to certain aspects, techniques for aperiodically reporting channel state information (CSI) on protected and unprotected resources are provided. The protected resources may include resources in which transmissions in a first cell are protected by restricting transmissions in a second cell. According to certain aspects, a request for channel quality indicator (CQI) may be sent in a first subframe, CQI may be measured for a second subframe having a first offset from the first subframe, and a corresponding CQI report sent in a third subframe having a second offset from the first subframe.

65 Claims, 10 Drawing Sheets

(51) Int. Cl.
*H04W 28/04* (2009.01)
*H04W 48/08* (2009.01)
*H04W 72/00* (2009.01)
*H04W 72/04* (2009.01)
*H04W 72/08* (2009.01)

(56) References Cited

U.S. PATENT DOCUMENTS

| | | | |
|---|---|---|---|
| 7,756,058 B2 * | 7/2010 | Cordeiro et al. | 370/252 |
| 8,050,683 B2 * | 11/2011 | Brueck et al. | 455/438 |
| 8,305,972 B2 * | 11/2012 | Baker et al. | 370/329 |
| 8,457,091 B2 * | 6/2013 | Pani et al. | 370/342 |
| 8,699,587 B2 | 4/2014 | Blanz et al. | |
| 2007/0191015 A1 * | 8/2007 | Hwang et al. | 455/442 |
| 2008/0160917 A1 * | 7/2008 | Dominique et al. | 455/67.11 |
| 2008/0259811 A1 * | 10/2008 | Cordeiro et al. | 370/252 |
| 2009/0116421 A1 | 5/2009 | Kawasaki | |
| 2009/0196250 A1 * | 8/2009 | Feng et al. | 370/330 |
| 2009/0203383 A1 * | 8/2009 | Shen et al. | 455/450 |
| 2010/0035555 A1 | 2/2010 | Bala et al. | |
| 2010/0124205 A1 * | 5/2010 | Ghanadan et al. | 370/336 |
| 2010/0202311 A1 * | 8/2010 | Lunttila et al. | 370/252 |
| 2011/0019637 A1 * | 1/2011 | Ojala et al. | 370/329 |
| 2011/0317652 A1 * | 12/2011 | Kim et al. | 370/329 |
| 2012/0092989 A1 * | 4/2012 | Baldemair et al. | 370/230 |
| 2013/0121301 A1 * | 5/2013 | Kim et al. | 370/329 |
| 2013/0194940 A1 * | 8/2013 | Li et al. | 370/252 |
| 2013/0235756 A1 * | 9/2013 | Seo et al. | 370/252 |
| 2013/0286933 A1 * | 10/2013 | Lee et al. | 370/315 |

FOREIGN PATENT DOCUMENTS

| | | |
|---|---|---|
| CN | 101467364 A | 6/2009 |
| RU | 2272357 C2 | 3/2006 |
| RU | 2364046 C2 | 8/2009 |
| WO | WO-03069807 A1 | 8/2003 |
| WO | 2005034555 A1 | 4/2005 |
| WO | WO-2006073271 A1 | 7/2006 |
| WO | 2007031956 A2 | 3/2007 |
| WO | WO-2007144947 A1 | 12/2007 |
| WO | WO-2008022243 A2 | 2/2008 |
| WO | 2009120797 A1 | 10/2009 |

OTHER PUBLICATIONS

Hitachi, R1-090068 "Interference management for broadband transmission with antenna port 5," Jan. 2009.*
Huawei, R1-101061 "CQI Enhancement for Interference Varying Environments" Feb. 2009.*
Mediatek Inc: "Remaining details for Rel-10 eICIC", 3GPP Draft; R1-110692 Remaining Details for Rel-10 eICIC, 3rd Generation Partnership Project (3GPP), Mobile Competence Centre; 650, Route des Lucioles; F-06921 Sophia-Antipolis Cedex ; France, vol. RAN WG1, No. Taipei, Taiwan; 20110221-20110225, Feb. 17, 2011, XP050599172, [retrieved on Feb. 17, 2011].
Ericsson: "Finalizing the CQI Definition", 3GPP Draft; R1-082465, 3rd Generation Partnership Project (3GPP), Mobile Competence Centre ; 650, Route des Lucioles ; F-06921 Sophia-Antipolis Cedex ; France, vol. RAN WGI, No. Warsaw, Poland; 20080625, Jun. 25, 2008, XP050110736, [retrieved on Jun. 25, 2008].
Huawei: "CQI Enhancement for Interference Varying Environments", 3GPP Draft; R1-101061 CQI Enhancement for Interference Varying Environments VER (Final), 3rd Generation Partnership Project (3GPP), Mobile Competence Centre ; 650, Route des Lucioles ; F-06921 Sophia-Antipolis Cedex ; France, vol. RAN WGI, No. San Francisco, USA; 20100222, Feb. 16, 2010, XP050418632, [retrieved on Feb. 16, 2010].
Huawei: "Enhanced ICIC and Resource-Specific CQI Measurement", 3GPP Draft; R1-101981, 3rd Generation Partnership Project (3GPP), Mobile Competence Centre ; 650, Route des Lucioles ; F-06921 Sophia-Antipolis Cedex ; France, vol. RAN WGI, No. Beijing, china; 20100412, Apr. 6, 2010, XP050419318, [retrieved on Apr. 6, 2010].
International Search Report and Written Opinion—PCT/US2011/032308, ISA/EPO—Jul. 6, 2011.
Philips: "CQI/PMI reference measurement periods", 3GPP Draft; R1-082528, 3rd Generation Partnership Project (3GPP), Mobile Competence Centre ; 650, Route des Lucioles ; F-06921 Sophia-Antipolis Cedex ; France, vol. RAN WGI, No. Warsaw, Poland; 20080625, Jun. 25, 2008, XP050110793, [retrieved on Jun. 25, 2008].

* cited by examiner

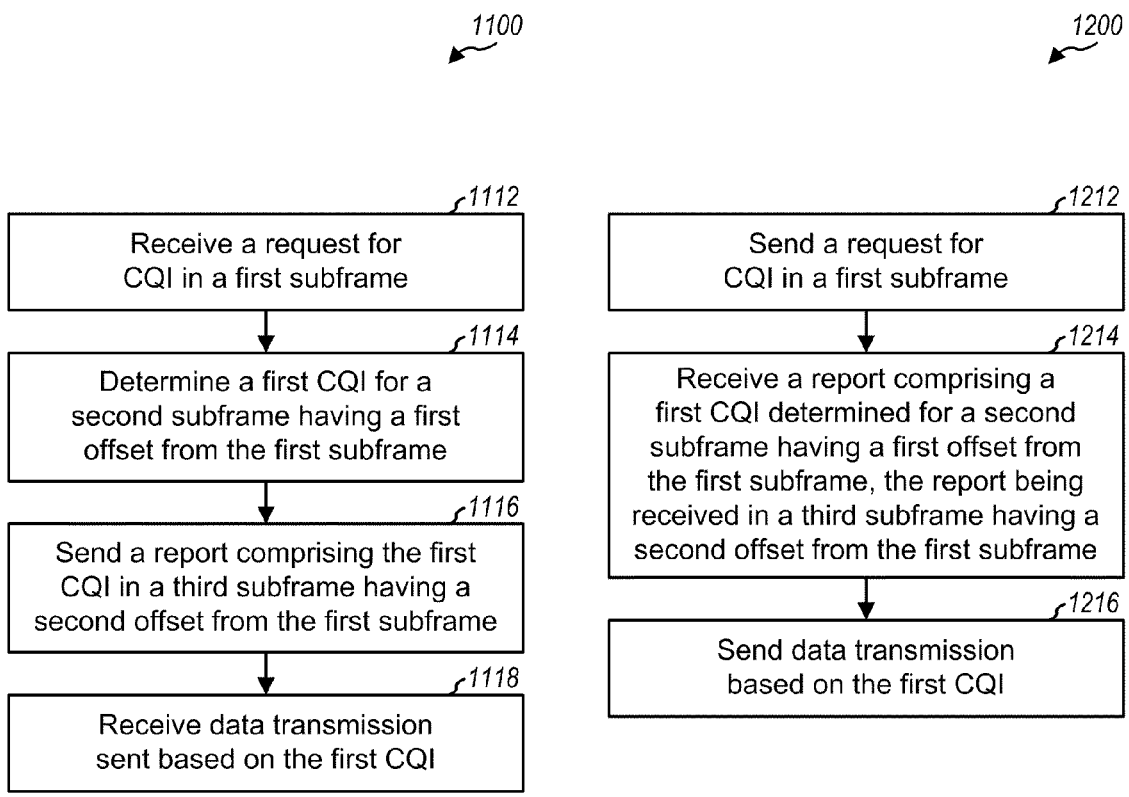

APERIODIC CQI REPORTING IN A WIRELESS COMMUNICATION NETWORK

CROSS-REFERENCE TO RELATED APPLICATIONS

This application claims priority to U.S. Provisional Application Ser. No. 61/323,824, entitled, "APERIODIC CQI REPORTING IN A WIRELESS COMMUNICATION NETWORK", filed on Apr. 13, 2010, which is expressly incorporated by reference herein in its entirety.

BACKGROUND

I. Field

The present disclosure relates generally to communication, and more specifically to techniques for reporting channel quality indicator (CQI) in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Certain aspects of the present disclosure provide a method for wireless communication. The method generally includes receiving a request for channel quality indicator (CQI) in a first subframe, determining a first CQI for a second subframe having a first offset from the first subframe, and sending a report comprising the first CQI in a third subframe having a second offset from the first subframe.

Certain aspects of the present disclosure provide a method for wireless communication. The method generally includes sending a request for channel quality indicator (CQI) in a first subframe and receiving a report comprising a first CQI determined for a second subframe having a first offset from the first subframe, the report being received in a third subframe having a second offset from the first subframe.

Certain aspects of the present disclosure provide an apparatus for wireless communication. The apparatus generally includes means for receiving a request for channel quality indicator (CQI) in a first subframe, means for determining a first CQI for a second subframe having a first offset from the first subframe, and means for sending a report comprising the first CQI in a third subframe having a second offset from the first subframe.

Certain aspects of the present disclosure provide an apparatus for wireless communication. The apparatus generally includes means for sending a request for channel quality indicator (CQI) in a first subframe and means for receiving a report comprising a first CQI determined for a second subframe having a first offset from the first subframe, the report being received in a third subframe having a second offset from the first subframe.

Certain aspects of the present disclosure provide an apparatus for wireless communication. The apparatus generally includes at least one processor configured to receive a request for channel quality indicator (CQI) in a first subframe, determine a first CQI for a second subframe having a first offset from the first subframe, and send a report comprising the first CQI in a third subframe having a second offset from the first subframe; and a memory coupled with the at least one processor.

Certain aspects of the present disclosure provide an apparatus for wireless communication. The apparatus generally includes at least one processor configured to send a request for channel quality indicator (CQI) in a first subframe and receive a report comprising a first CQI determined for a second subframe having a first offset from the first subframe, the report being received in a third subframe having a second offset from the first subframe.

Certain aspects of the present disclosure provide a computer program product comprising a computer readable medium with instructions stored thereon. The instructions are generally executable by one or more processors for receiving a request for channel quality indicator (CQI) in a first subframe, determining a first CQI for a second subframe having a first offset from the first subframe, and sending a report comprising the first CQI in a third subframe having a second offset from the first subframe.

Certain aspects of the present disclosure provide a computer program product comprising a computer readable medium with instructions stored thereon. The instructions are generally executable by one or more processors for sending a request for channel quality indicator (CQI) in a first subframe and receiving a report comprising a first CQI determined for a second subframe having a first offset from the first subframe, the report being received in a third subframe having a second offset from the first subframe.

BRIEF DESCRIPTION OF THE DRAWINGS

FIGS. 11 and 12 illustrate example operations for aperiodic reporting, in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
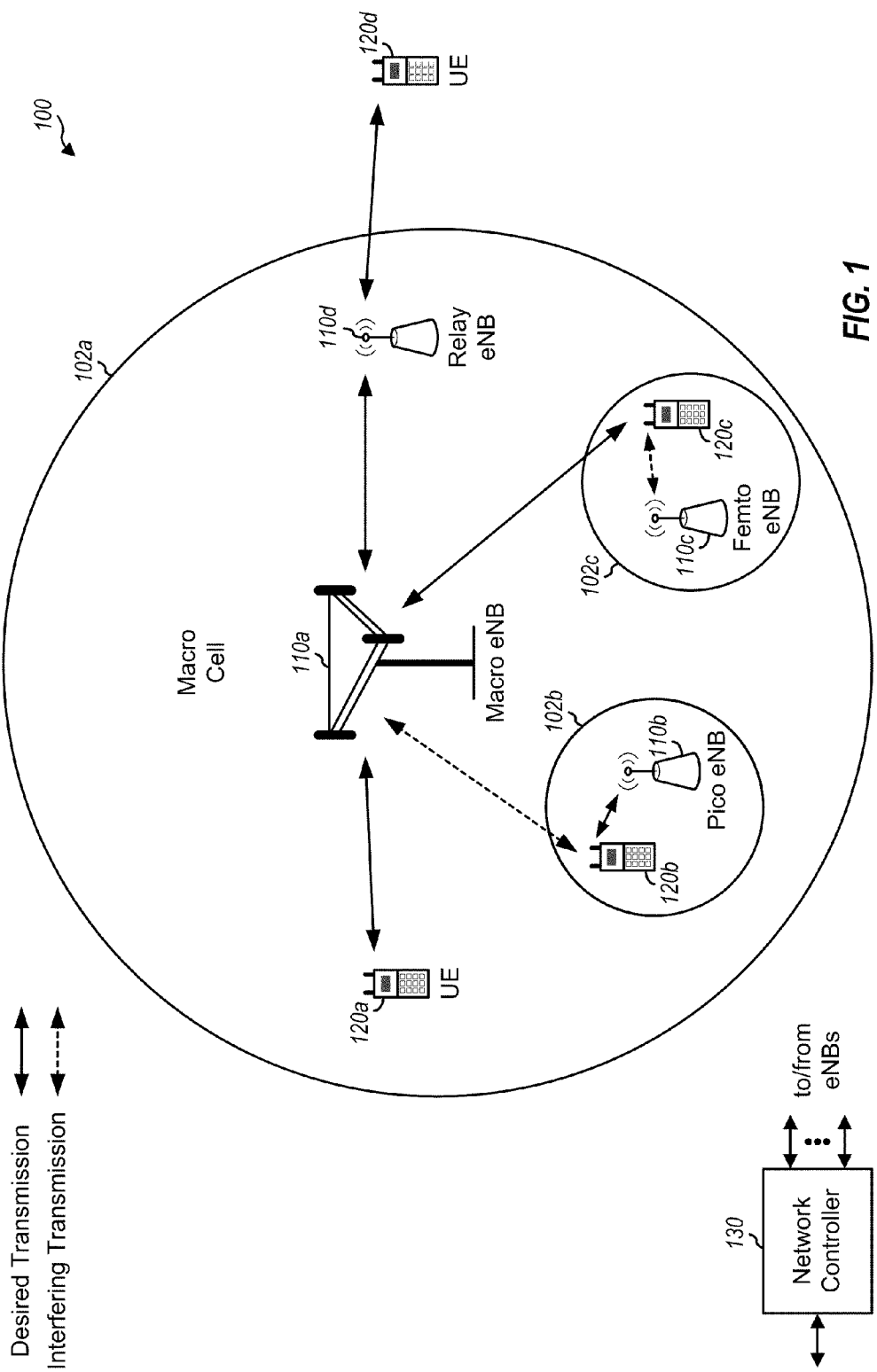
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB" and "base station" are used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
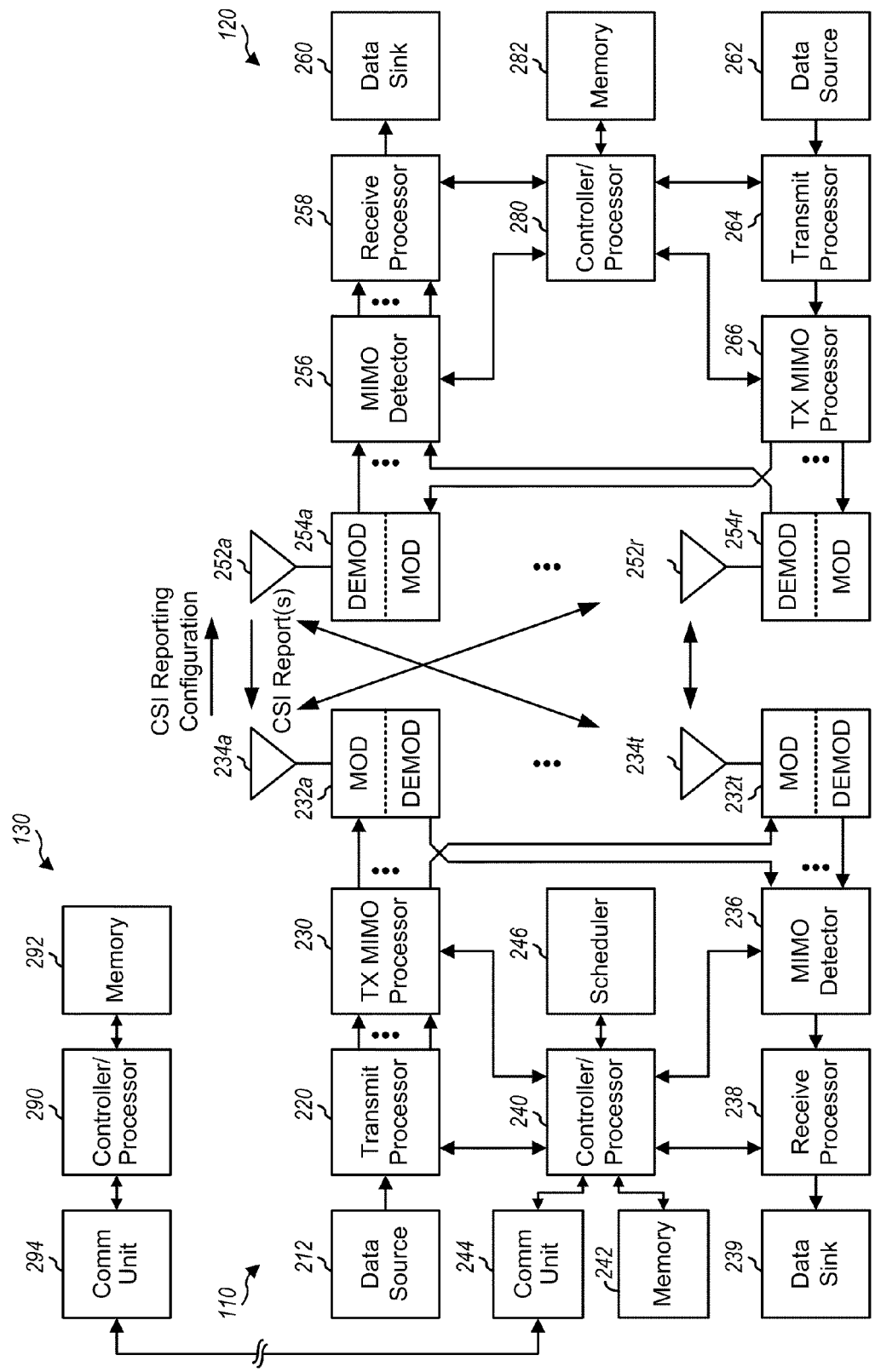
FIG. 2 shows a block diagram of a base station and a UE.

FIG. 2 shows a block diagram of a design of a base station/eNB 110 and a UE 120, which may be one of the base stations/eNBs and one of the UEs in FIG. 1. The various components (e.g., processors) shown in FIG. 2 may be utilized to perform the CSI reporting techniques described herein. As used herein, the term CSI general refers to any type of information describing characteristics of the wireless channel. As will be described in greater detail below, CSI feedback may include one or more of channel quality indication (CQI), rank indication (RI), and precoding matrix index (PMI). Thus, while certain descriptions below may refer to CQI as an example type of CSI, it should be understood that CQI is just one example of a type of CSI that may be reported in accordance to techniques discussed herein.

As illustrated, the base station 110 may transmit CSI reporting configuration information to the UE 120. As will be described in greater detail below, the UE 120 may send reports for clean CSI (for protected subframes) and unclean (for non-protected subframes) in accordance with the CSI configuration information. As will be described in greater detail below, the CSI reports may include clean and unclean CSI jointly encoded in the same report or time division multiplexed in separate reports.

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs and control information from a controller/processor 240. Processor 220 may process (e.g., encode and modulate) the data and control information to obtain data symbols and control symbols, respectively. Processor 220 may also generate reference symbols for synchronization signals, reference signals, etc. A transmit (TX) multiple-input multiple-output (MIMO) processor 230 may perform spatial processing (e.g., precoding) on the data symbols, the control symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110, downlink signals from other base stations, and/or P2P signals from other UEs and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information to a controller/processor 280.

On the uplink, at UE 120, a transmit processor 264 may receive data from a data source 262 and control information from controller/processor 280. Processor 264 may process (e.g., encode and modulate) the data and control information to obtain data symbols and control symbols, respectively. Processor 264 may also generate reference symbols for one or more reference signals, etc. The symbols from transmit processor 264 may be precoded by a TX MIMO processor 266 if applicable, further processed by modulators 254a through 254r (e.g., for SC-FDM, OFDM, etc.), and transmitted to base station 110, other base stations, and/or other UEs. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120 and other UEs. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct processing for the techniques described herein. Processor 280 and/or other processors and modules at UE 120 may perform or direct processing for the techniques described herein. Memories 242 and 282 may store data and program codes for base station 110 and UE 120, respectively. A communication (Comm) unit 244 may enable base station 110 to communicate with other network entities (e.g., network controller 130). A scheduler 246 may schedule UEs for data transmission on the downlink and/or uplink.

According to certain aspects, the receive processor 238 and/or controller/processor 240 may process CSI reports sent by the UE 120 and use this information to control transmissions.

FIG. 2 also shows a design of network controller 130 in FIG. 1. Within network controller 130, a controller/processor 290 may perform various functions to support communication for UEs. Controller/processor 290 may perform processing for the techniques described herein. A memory 292 may store program codes and data for network controller 130. A communication unit 294 may enable network controller 130 to communicate with other network entities.

As noted above, the BS 110 and UE 120 may utilize FDD or TDD. For FDD, the downlink and uplink may be allocated separate frequency channels, and downlink transmissions and uplink transmissions may be sent concurrently on the two frequency channels.

Figure 3:
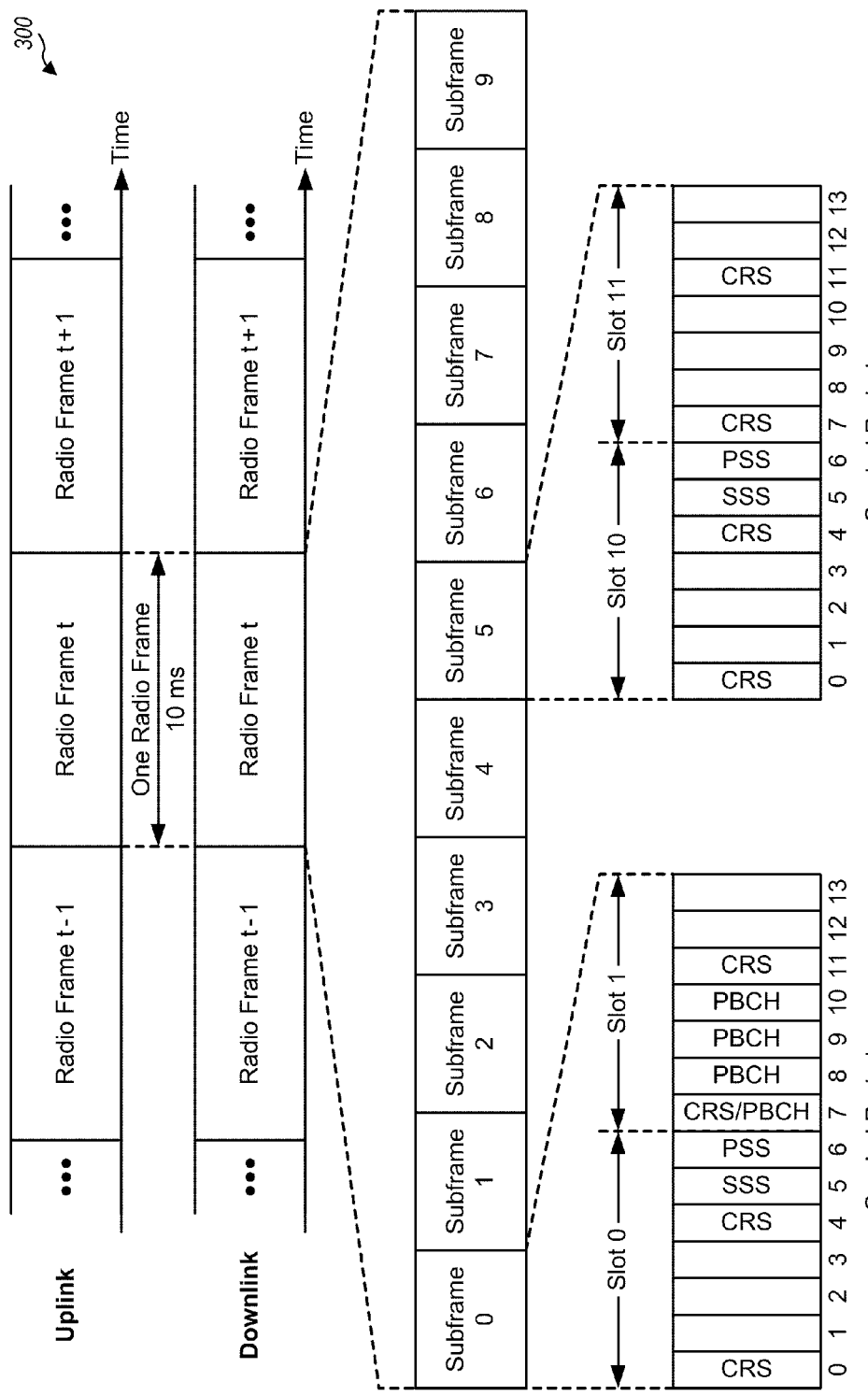
FIG. 3 shows a frame structure for frequency division duplexing (FDD).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 2. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes.

Figure 4:
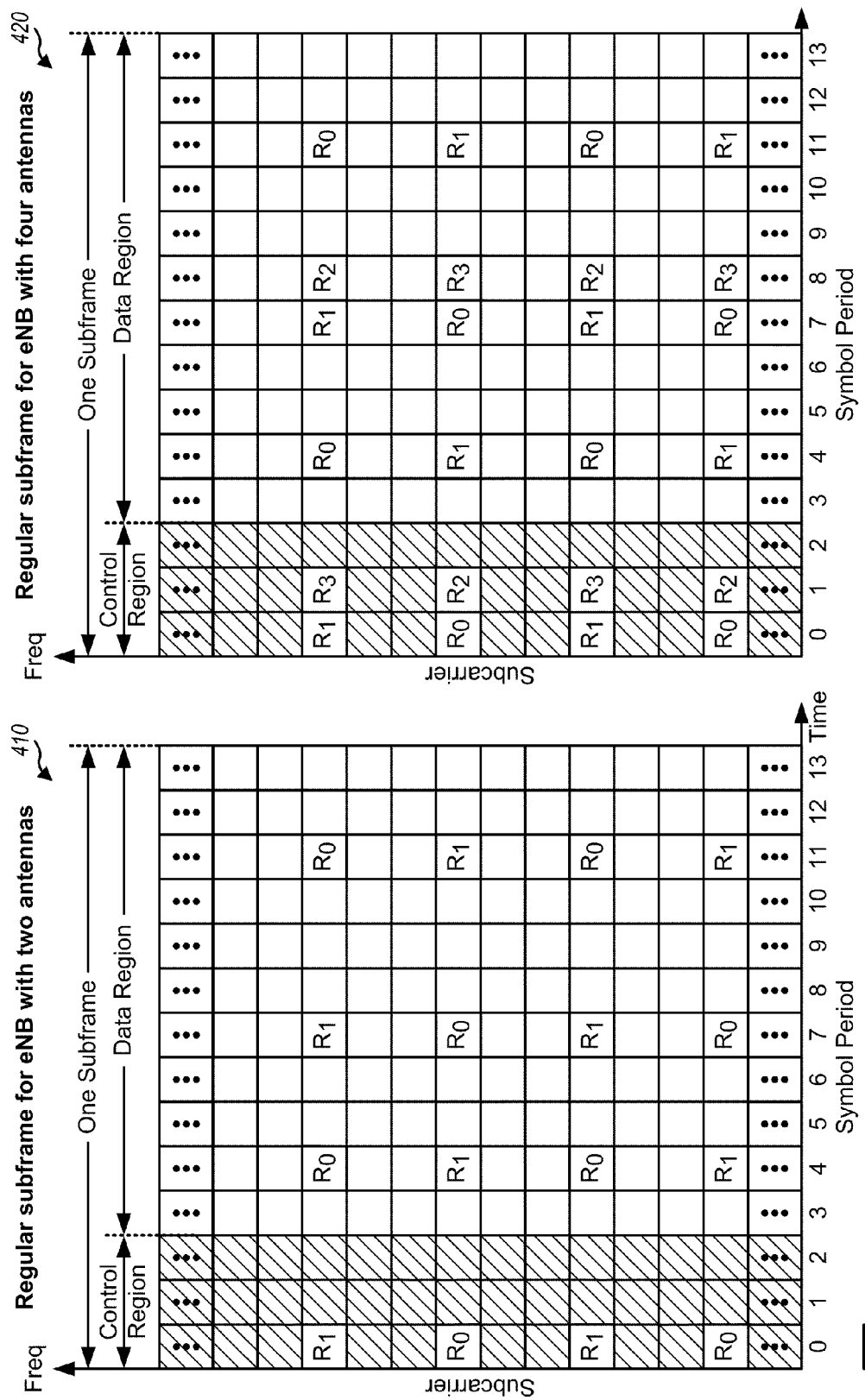
FIG. 4 shows two exemplary subframe formats for the downlink.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on the cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

Figure 5:
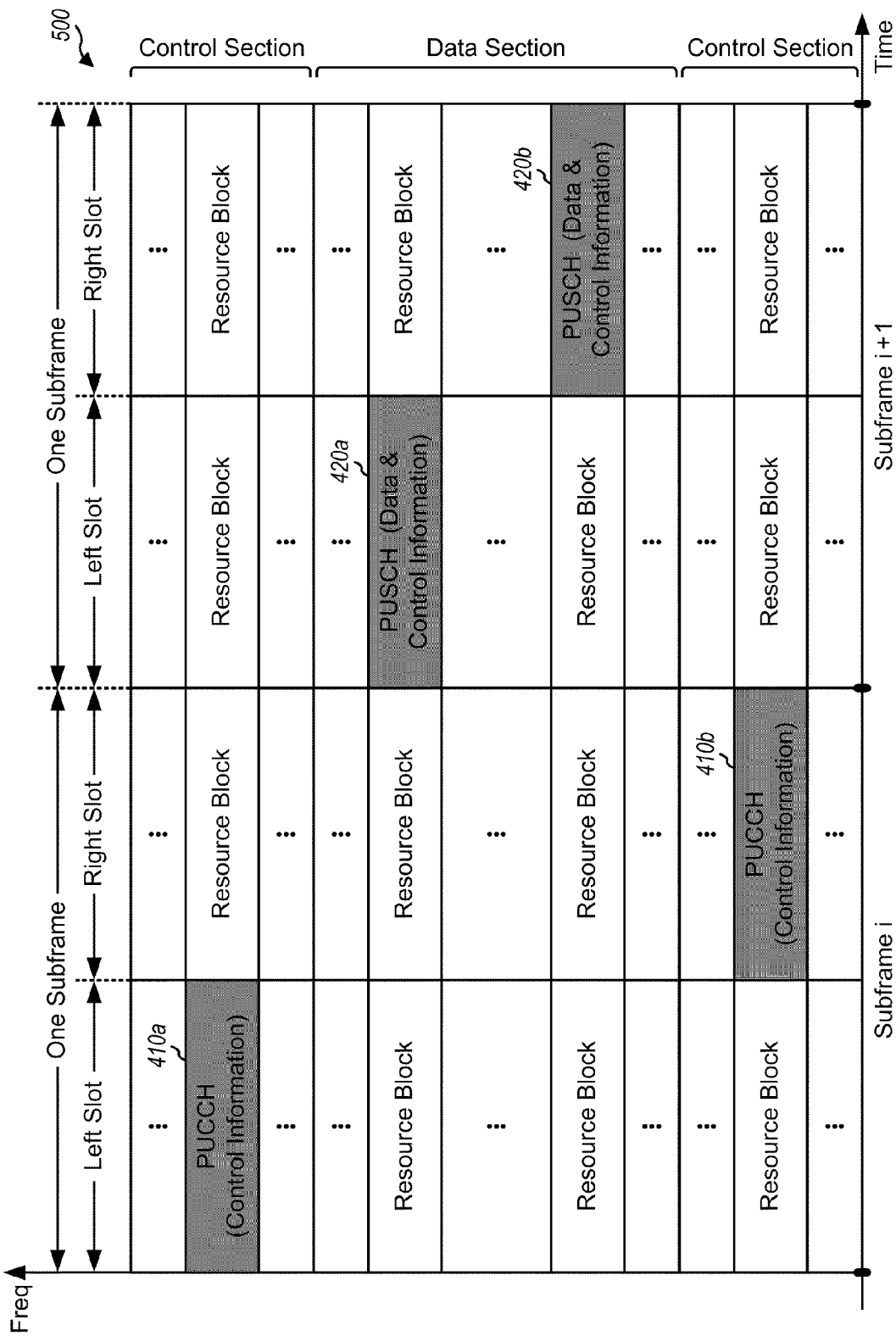
FIG. 5 shows an exemplary subframe format for the uplink.

FIG. 5 shows an exemplary format for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information/data. The data section may include all resource blocks not included in the control section. The design in FIG. 5 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit traffic data to the Node B. The UE may transmit control information in a Physical Uplink Control Channel (PUCCH) on the assigned resource blocks in the control section. The UE may transmit only traffic data or both traffic data and control information in a Physical Uplink Shared Channel (PUSCH) on the assigned resource blocks in the data section. An uplink transmission may span both slots of a subframe and may hop across frequency, as shown in FIG. 5.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

Various interlace structures may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, an interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric.

A UE may operate in a dominant interference scenario in which the UE may observe high interference from one or more interfering eNBs. A dominant interference scenario may occur due to restricted association. For example, in FIG. 1, UE 120c may be close to femto eNB 110c and may have high received power for eNB 110c. However, UE 120c may not be able to access femto eNB 110c due to restricted association and may then connect to macro eNB 110a with lower received power. UE 120c may then observe high interference from femto eNB 110c on the downlink and may also cause high interference to femto eNB 110c on the uplink.

A dominant interference scenario may also occur due to range extension, which is a scenario in which a UE connects to an eNB with lower pathloss and possibly lower SINR among all eNBs detected by the UE. For example, in FIG. 1, UE 120b may be located closer to pico eNB 110b than macro eNB 110a and may have lower pathloss for pico eNB 110b. However, UE 120b may have lower received power for pico eNB 110b than macro eNB 110a due to a lower transmit power level of pico eNB 110b as compared to macro eNB 110a. Nevertheless, it may be desirable for UE 120b to connect to pico eNB 110b due to the lower pathloss. This may result in less interference to the wireless network for a given data rate for UE 120b.

Communication in a dominant interference scenario may be supported by performing inter-cell interference coordination (ICIC). According to certain aspects of ICIC, resource coordination/partitioning may be performed to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB.

In general, time and/or frequency resources may be allocated to eNBs via resource partitioning. According to certain aspects, the system bandwidth may be partitioned into a number of subbands, and one or more subbands may be allocated to an eNB. In another design, a set of subframes may be allocated to an eNB. In yet another design, a set of resource blocks may be allocated to an eNB. For clarity, much of the description below assumes a time division multiplex (TDM) resource partitioning design in which one or more interlaces may be allocated to an eNB. The subframes of the allocated interlace(s) may observe reduced or no interference from strong interfering eNBs.

Figure 6:
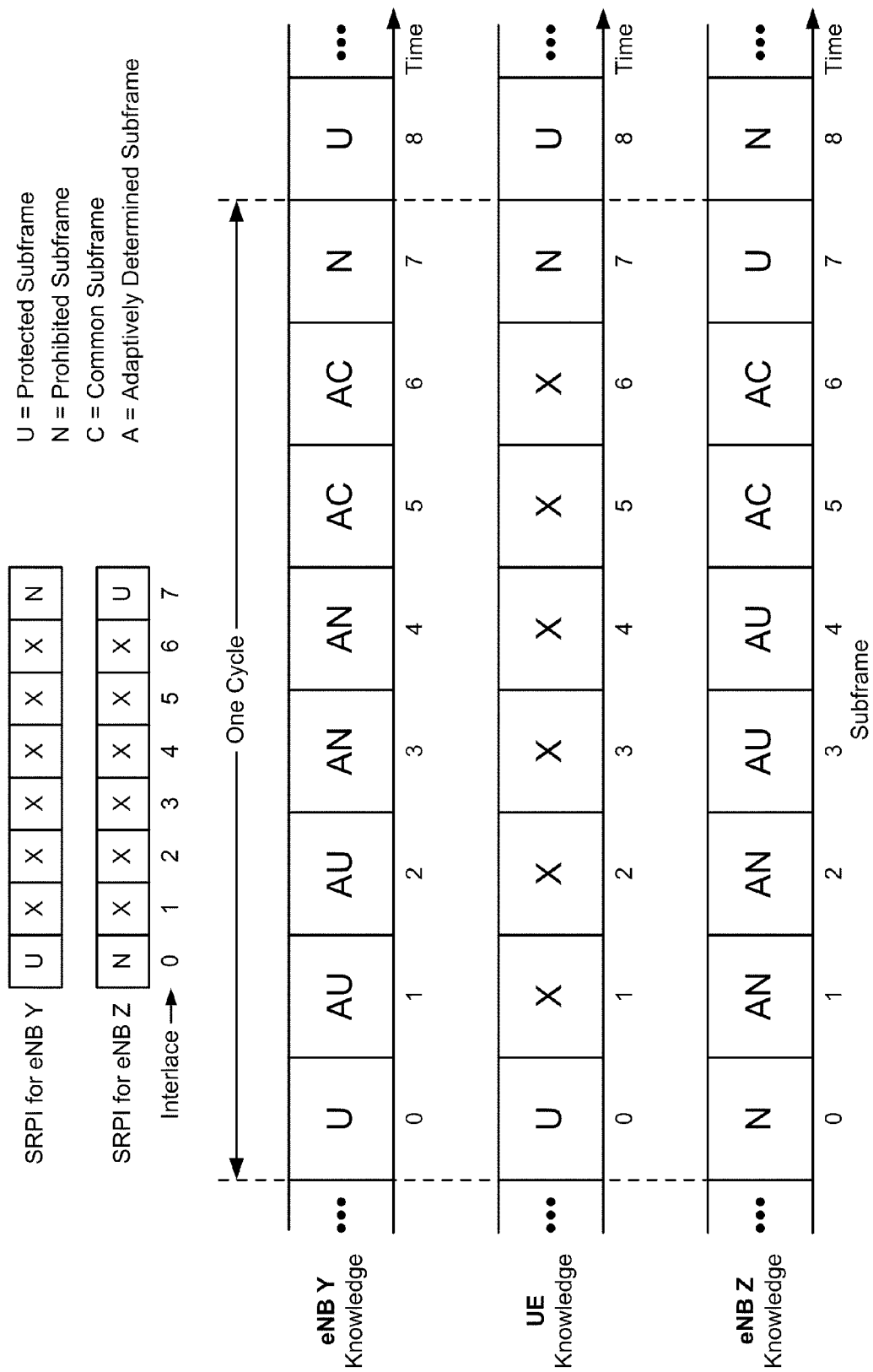
FIG. 6 shows an example partition of resources.

FIG. 6 shows an example of TDM resource partitioning to support communication in a dominant interference scenario involving eNBs Y and Z. In this example, eNB Y may be allocated interlace 0, and eNB Z may be allocated interlace 7 in a semi-static or static manner, e.g., via negotiation between the eNBs through the backhaul. eNB Y can transmit in subframes of interlace 0 and may avoid transmitting in subframes of interlace 7. Conversely, eNB Z can transmit in subframes of interlace 7 and may avoid transmitting in subframes of interlace 0. The subframes of the remaining interlaces 1 through 6 may be adaptively/dynamically allocated to eNB Y and/or eNB Z.

Table 1 lists different types of subframes in accordance with one design. From the perspective of eNB Y, an interlace allocated to eNB Y may include "protected" subframes (U subframes) that can be used by eNB Y and having little or no interference from interfering eNBs. An interlace allocated to another eNB Z may include "prohibited" subframes (N subframes) that cannot be used by eNB Y for data transmission. An interlace not allocated to any eNB may include "common" subframes (C subframes) that can be used by different eNBs. A subframe that is adaptively allocated is denoted with an "A" prefix and may be a protected subframe (AU subframe), or a prohibited subframe (AN subframe), or a common subframe (AC subframe). The different types of subframes may also be referred to by other names. For example, a protected subframe may be referred to as a reserved subframe, an allocated subframe, etc.

TABLE 1

Subframe Types

| Subframe Type | Description | Expected CQI |
|---|---|---|
| U | Protected subframe that can be used for data transmission and having reduced or no interference from interfering eNBs. | High CQI |
| N | Prohibited subframe that cannot be used for data transmission. | Low CQI |
| C | Common subframe that can be used for data transmission by different eNBs. | High or Low CQI |

According to certain aspects, an eNB may transmit static resource partitioning information (SRPI) to its UEs. According to certain aspects, the SRPI may comprise Q fields for the Q interlaces. The field for each interlace may be set to "U" to indicate the interlace being allocated to the eNB and including U subframes, or to "N" to indicate the interlace being allocated to another eNB and including N subframes, or to "X" to indicate the interlace being adaptively allocated to any eNB and including X subframes. A UE may receive the SRPI from the eNB and can identify U subframes and N subframes for the eNB based on the SRPI. For each interlace marked as "X" in the SRPI, the UE may not know whether the X subframes in that interlace will be AU subframes, or AN subframes, or AC subframes. The UE may know only the semi-static part of the resource partitioning via the SRPI whereas the eNB may know both the semi-static part and adaptive part of the resource partitioning.

A UE may estimate received signal quality of an eNB based on a CRS received from the eNB. The UE may determine CQI based on the received signal quality and may report the CQI to the eNB. The eNB may use the CQI for link adaptation to select a modulation and coding scheme (MCS) for data transmission to the UE. Different types of subframes may have different amounts of interference and hence may have very different CQIs. In particular, protected subframes (e.g., U and AU subframes) may be characterized by better CQI since dominant interfering eNBs do not transmit in these subframes. In contrast, CQI may be much worse for other subframes (e.g., N, AN and AC subframes) in which one or more dominant interfering eNBs can transmit. From the point of view of CQI, AU subframes may be equivalent to U subframes (both are protected), and AN subframes may be equivalent to N subframes (both are prohibited). AC subframes may be characterized by a completely different CQI. To achieve good link adaptation performance, an eNB should have relatively accurate CQI for each subframe in which the eNB transmits traffic data to a UE.

Aperiodic CQI Reporting

According to certain aspects, an eNB (or other type of base station) desiring to receive CQI from a UE may send a CQI request to the UE in subframe n. The UE may receive the CQI request and, in response, may determine CQI for subframe n. The UE may then send a report with the CQI to the eNB, conventionally, a fixed number of subframes later (e.g., in subframe n+4). Thus, conventional CQI reporting typically follows a strict timeline, with CQI measured in the same subframe in which a CQI request is received and reported a fixed time (e.g., four subframes) later. The timeline for CQI measurement and reporting is different for TDD due to a limited number of subframes available for each of the downlink and uplink. While the techniques described herein are not limited to FDD, to facilitate understanding, much of the description below assumes FDD.

Certain aspects of the present disclosure provide a flexible CQI reporting scheme, which may take advantage of resource partitioning by allowing CQI measurements to take place in a subframe at a first offset from the subframe in which the request is received and the report to be sent in a subframe at a second offset.

A subframe in which CQI is measured is referred to herein as a reference subframe. If the CQI request is sent in a U subframe, then the UE may determine CQI for the U subframe having reduced or no interference from interfering eNBs. A CQI for a U subframe may be referred to as a "clean" CQI to emphasize that it is measured over a subframe in which dominant interfering eNBs do not transmit data. If the CQI request is sent in an AC subframe, then the UE may determine CQI for the AC subframe having interference from interfering eNBs. A CQI for an unprotected subframe may be referred to as an "unclean" CQI to emphasize that it is measured over a subframe in which one or more interfering eNBs may be transmitting. An unprotected subframe may be an AC subframe, an N subframe, or an AN subframe.

As will be described in greater detail below, an eNB may obtain a clean CQI by sending a CQI request in a protected (e.g., U) subframe. The eNB may obtain an unclean CQI by sending a CQI request in an unprotected (e.g., AC) subframe. While an eNB may typically avoid sending CQI requests in an N or AN subframe, an unclean CQI for an N or AN subframe may be obtained in other manners, as described below.

In an aspect, CQI may be measured in a configurable subframe instead of a fixed subframe, which may be a subframe in which a CQI request is sent. This may allow flexibility to select which subframe to measure CQI.

In another aspect, CQI may be reported in a configurable subframe instead of a fixed subframe, which may be a fixed offset from a subframe in which a CQI request is sent. This may allow flexibility to select which subframe to report CQI.

Figure 7:
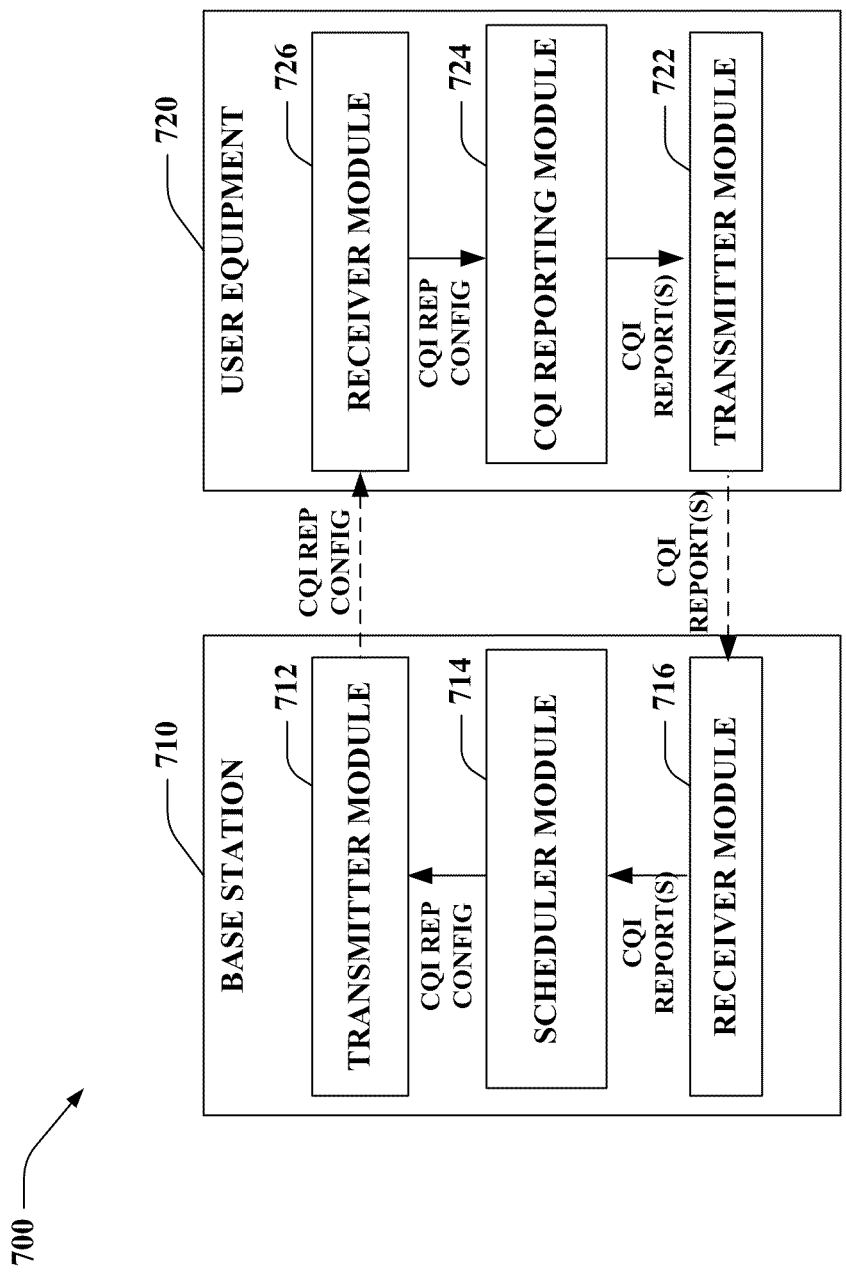
FIG. 7 shows example functional components of a base station and a UE, in accordance with certain aspects of the present disclosure.

FIG. 7 illustrates an example system 700 having a base station 710 (e.g., an eNB) and UE 720, capable of performing the CQI reporting techniques described herein.

As illustrated, the base station 710 may include a scheduler module 714 configured to generate CQI reporting configuration information to be sent to the UE 720, via a transmitter module 712. As will be described below, the configuration information may include one or more offset values. The offset values may include, for example, a first offset indicating an offset relative from a subframe carrying a CQI request in which a CQI measurement should be made and a second offset indicating when a corresponding CQI report should be sent.

As illustrated, the UE 720 may include a receiver module 726 that receives the CQI reporting configuration information. The receiver module 726 may provide the CQI reporting configuration information to a CQI reporting module 524 configured to generate and transmit CQI reports (e.g., for clean and unclean CQI), in accordance with the CQI reporting configuration information.

CQI reports may be provided to a transmitter module 722 for transmission to the base station 720. The base station 720 may receive the reports, via a receiver module 714, and utilize the information therein for subsequent transmissions to the UE 710 (e.g., selecting one or more modulation and coding schemes). As will be described in detail below, the CQI reports (or separate reports) may also include information such as rank indication (RI) and precoding matrix indicator (PMI) for protected and non-protected resources.

Figure 8:
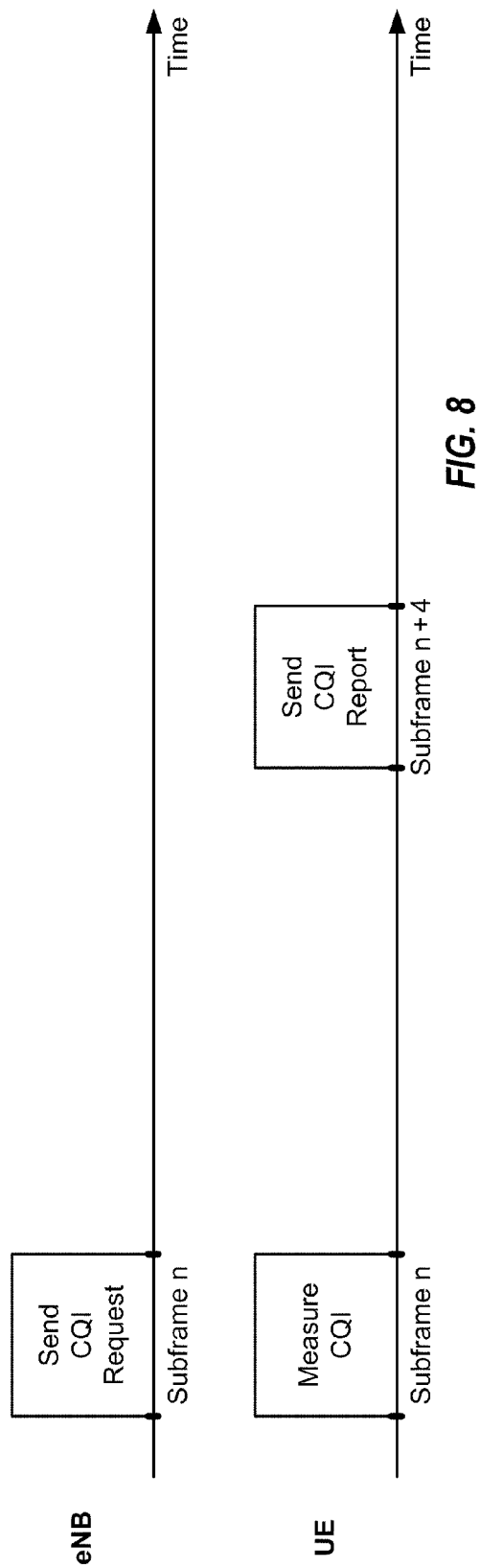
FIG. 8 illustrates an example aperiodic CQI reporting scheme.

FIG. 8 illustrates an example scheme for aperiodic CQI reporting, for example, in accordance with FDD in LTE. An eNB may desire to receive CQI from a UE and may send a CQI request to the UE in subframe n. The UE may receive the CQI request and, in response, may determine CQI for subframe n. The UE may then send a report comprising the CQI in subframe n+4 to the eNB. The scheme in FIG. 8 may have a strict timeline for CQI measurement and reporting. In particular, CQI is measured in the same subframe in which a CQI request is received and is reported four subframes later. The timeline for CQI measurement and reporting is different for TDD due to a limited number of subframes available for each of the downlink and uplink. For clarity, much of the description below assumes FDD.

For the scheme shown in FIG. 8, the eNB can select a specific subframe for the UE to measure/determine CQI by sending a CQI request in that subframe. A subframe in which CQI is measured may be referred to as a reference subframe. If the CQI request is sent in a U subframe, then the UE may determine CQI for the U subframe having reduced or no interference from interfering eNBs. A CQI for a U subframe may be referred to as a "clean" CQI to emphasize that it is measured over a subframe in which dominant interfering eNBs do not transmit data. If the CQI request is sent in an AC subframe, then the UE may determine CQI for the AC subframe having interference from interfering eNBs. A CQI for an unprotected subframe may be referred to as an "unclean" CQI to emphasize that it is measured over a subframe in which one or more interfering eNBs may be transmitting. An unprotected subframe may be an AC subframe, an N subframe, or an AN subframe.

For the scheme shown in FIG. 8, the eNB may obtain a clean CQI by sending a CQI request in a U subframe. The eNB may obtain an unclean CQI by sending a CQI request in an AC subframe. The eNB should not send a CQI request in an N or AN subframe. An unclean CQI for an N or AN subframe may be obtained in other manners, as described below.

According to certain aspects, CQI may be measured in a configurable subframe instead of a fixed subframe, which may be a subframe in which a CQI request is sent. This may allow flexibility to select which subframe to measure CQI.

In another aspect, CQI may be reported in a configurable subframe instead of a fixed subframe, which may be a fixed offset from a subframe in which a CQI request is sent. This may allow flexibility to select which subframe to report CQI.

Figure 9:
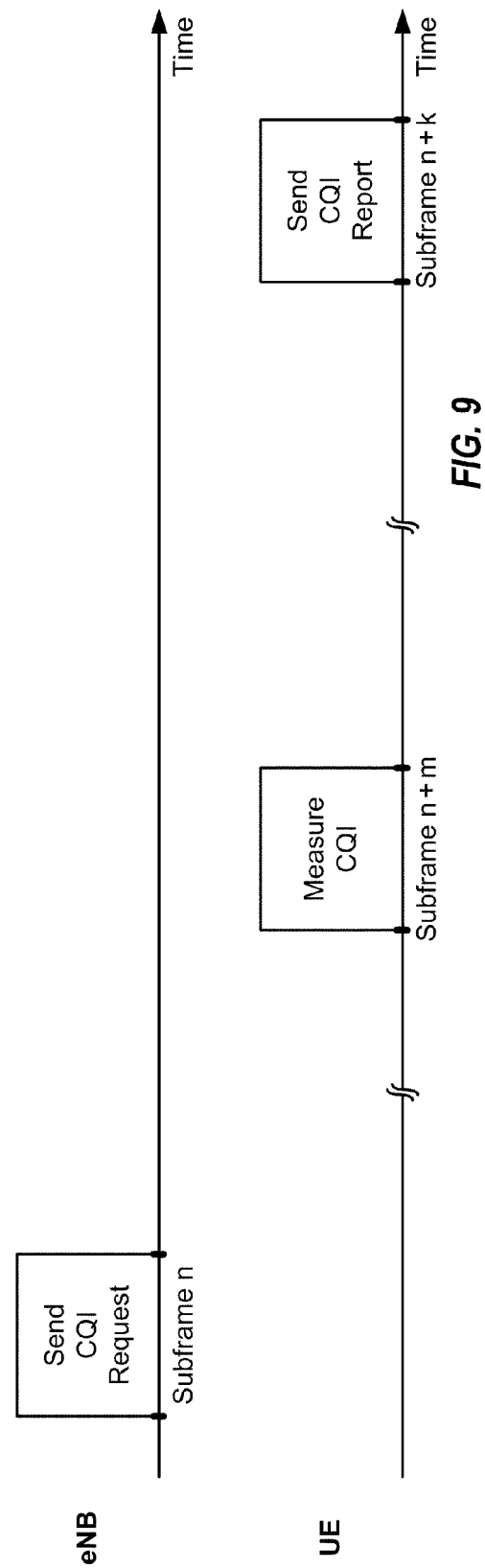
FIGS. 9 and 10 illustrate example aperiodic CQI reporting schemes, in accordance with certain aspects of the present disclosure.

FIG. 9 shows an example aperiodic CQI reporting scheme with configurable measurement subframe and configurable reporting subframe, in accordance with certain aspects of the present disclosure. The illustrated scheme may be used, for example, for FDD in LTE.

An eNB may desire to receive CQI from a UE and may send a CQI request to the UE in subframe n. The UE may receive the CQI request and, in response, may determine CQI for subframe n+m, where m may be a configurable offset. The UE may then send a report comprising the CQI in subframe n+k to the eNB, where k may be another configurable offset. Due to processing delay at the UE, a certain minimum number of subframes may be required between CQI measurement and reporting, so that typically k>m. The scheme in FIG. 9 has a flexible timeline for CQI measurement and reporting. In particular, CQI may be measured in any one of a set of subframes, which may follow and possibly include subframe n. CQI may be reported in any one of a set of subframes, which may follow subframe n+m.

Offset m for the reference subframe for CQI measurement may be determined in various manners. According to certain aspects, offset m may be configured by the eNB and signaled to the UE via upper layer signaling, e.g., Radio Resource Control (RRC) signaling. In this design, offset m may be semi-static and may be used until it is reconfigured by the eNB. In another design, offset m may be sent with the CQI request. In this design, offset m may be dynamic and may be selected specifically for the CQI request. In yet another design, the UE may cycle through a range of possible offsets and may select a different offset each time a CQI request is received. The range of possible offsets may be fixed (e.g., may be specified as a range of 0 to Q−1) and may be known a priori by both the UE and eNB. The range of possible offsets may also be configurable and may be selected by the eNB and signaled to the UE. Offset m may also be determined in other manners.

Offset k for the subframe for CQI reporting may also be determined in various manners. According to certain aspects, offset k may be configured by the eNB and signaled (e.g., via upper layer signaling) to the UE. In another design, offset k may be sent with the CQI request. According to certain aspects, offset k may be restricted to subframes of an interlace for the uplink allocated to the eNB. For example, offset k may be equal to 4 or 12, when Q=8. This design may ensure that the UE can reliably send the CQI report to the eNB based on the TDM resource partitioning. An offset of k=12 may provide sufficient flexibility without introducing excessive delay. Offset k may also be determined in other manners.

According to certain aspects, the UE may determine a single CQI for subframe n+m. This CQI may be (i) a clean CQI if subframe n+m is a U or AU subframe or (ii) an unclean CQI if subframe n+m is an AC, N, or AN subframe. In another design, the UE may be instructed to report a single CQI or multiple CQIs. The single CQI may be for subframe n+m and may be a clean CQI or an unclean CQI. The multiple CQIs may include a clean CQI and an unclean CQI. The clean CQI may be for subframe n+m or the closest U subframe. The unclean CQI may be for one or more unprotected subframe at or near subframe n+m.

The UE may be instructed to report one or multiple CQIs in various manners. According to certain aspects, the UE may be instructed to report one or multiple CQIs via upper layer signaling. In another design, the UE may be instructed via a bit in a CQI request. In yet another design, the UE may be instructed by use of different scrambling on a downlink control information (DCI) message carrying a CQI request. For example, the UE may be instructed to report multiple CQIs if a cyclic redundancy check (CRC) of the DCI message is scrambled or to report a single CQI otherwise. The UE may also be instructed to report one or multiple CQIs in other manners.

The UE may receive a downlink grant and a CQI request in the same subframe n. Traffic data, ACK/NACK, and CQI report may be transmitted in various manners. According to certain aspects, the eNB may transmit traffic data and the CQI request in subframe n, and the UE may transmit ACK/NACK in subframe n+4 and a CQI report in subframe n+12. In another design, the eNB may transmit traffic data in subframe n, and the UE may transmit both ACK/NACK and a CQI report in subframe n+12. In yet another design, the eNB may transmit traffic data in subframe n+8, and the UE may transmit both ACK/NACK and a CQI report in subframe n+12. Traffic data, ACK/NACK, and CQI report may also be transmitted in other manners.

The UE may receive an uplink grant and a CQI request in the same subframe n. Traffic data and CQI report may be transmitted in various manners. According to certain aspects, the UE may transmit traffic data in subframe n+4 and may transmit a CQI report in subframe n+12. In another design, the UE may transmit both traffic data and a CQI report in subframe n+12. Traffic data and CQI report may also be transmitted in other manners.

The UE may be configured to report subband CQI and/or wideband CQI. The system bandwidth may be partitioned into a number of subbands, and each subband may cover one or more resource blocks. A subband CQI may be determined for a particular subband. A wideband CQI may be determined for the entire system bandwidth.

The UE may support multiple-input multiple-output (MIMO) transmission on the downlink. For MIMO, an eNB may transmit one or more packets (or codewords) simultaneously via multiple transmit antennas at the eNB to multiple receive antennas at the UE. The UE may evaluate a MIMO channel from the eNB to the UE and may determine precoding information that can provide good MIMO transmission performance The precoding information may include (i) a rank indicator (RI) that indicates how many packets to transmit and/or (ii) a precoding matrix indicator (PMI) that indicates a precoding matrix to use by the eNB to precode data prior to transmission. RI may change more slowly than CQI and PMI. A number of MIMO modes may be supported. The precoding matrix may be selected and reported by the UE in some MIMO modes. The precoding matrix may be selected by the eNB (and hence not reported by the UE) in some other MIMO modes.

For MIMO, L packets may be transmitted via L layers formed with a precoding matrix, where L may be indicated by RI and may be equal to 1, 2, etc. In some MIMO modes, the L layers may observe similar SINRs, and a single CQI may be reported for all L layers. For example, a large delay cyclic delay diversity (CDD) mode in LTE may attempt to equalize SNR across all layers. In some other MIMO modes, the L layers may observe different SINRs, and one CQI may be reported for each layer. In this case, differential encoding may be used to reduce signaling overhead. With differential encoding, a CQI for a first layer may be sent as an absolute value and may be referred to as a base CQI. Another CQI for another layer may be sent as a relative value with respect to the base CQI and may be referred to as a differential CQI.

To support MIMO, the UE may determine and report up to L CQIs for L layers, RI, and PMI. The UE may send the CQIs, RI and PMI using various PUCCH report types defined in LTE. To support MIMO with resource partitioning, the UE may determine and report (i) up to L clean CQIs for L layers, a clean RI, and a clean PMI for a protected subframe and (ii) up to L unclean CQIs for L layers, an unclean RI, and an unclean PMI for at least one unprotected subframe. RI may be dependent on channel quality and may be different for protected and unprotected subframes. Hence, RI may be determined and reported separately for protected and unprotected subframes. PMI may be dependent on channel gains and may be similar for both protected and unprotected subframes. In this case, PMI may be reported with only clean CQI(s) or only unclean CQI(s). PMI may also be different in different subframes due to time-varying channels or for coordinated multipoint (CoMP) transmission such as cooperative beamforming (CBF). In this case, PMI may be reported with both clean and unclean CQIs.

In general, the UE may send clean and unclean channel feedback information in a report. Channel feedback information may comprise CQI, or RI, or PMI, or some other information, or a combination thereof. Clean channel feedback information may refer to channel feedback information for a protected subframe. Unclean channel feedback information may refer to channel feedback information for an unprotected subframe. The UE may send one or more clean CQIs, one or more unclean CQIs, a clean RI, an unclean RI, a clean PMI, an unclean PMI, or any combination thereof in a report. According to certain aspects, one clean CQI and one unclean CQI may be reported. In another design, one clean CQI may be reported for each layer indicated by the clean RI, and one unclean CQI may be reported for each layer indicated by the unclean RI. According to certain aspects, the clean RI and unclean RI may be determined independently for the protected and unprotected subframes. In another design, the unclean RI may be set to one or to the clean RI and may not be reported. According to certain aspects, a single PMI may be reported for both protected and unprotected subframes. In another design, both clean and unclean PMIs may be reported.

Figure 10:
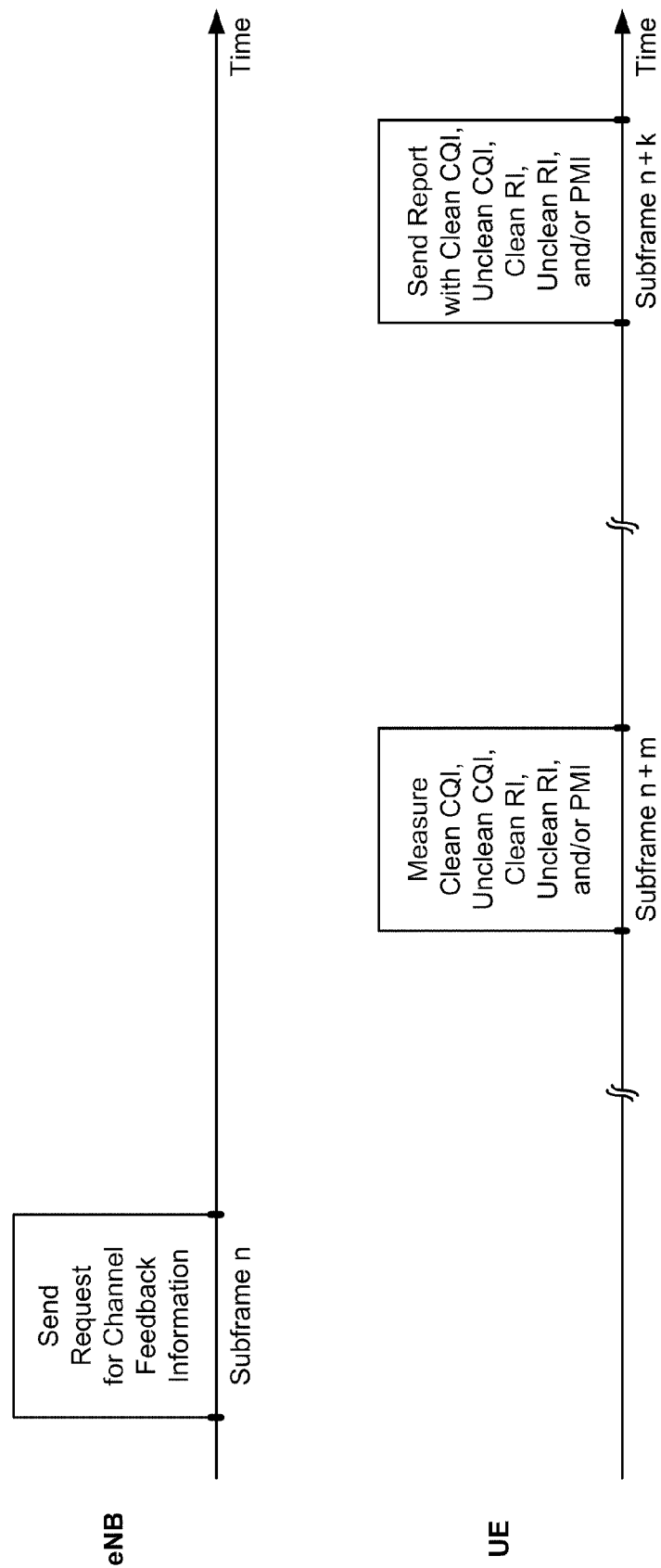

FIG. 10 shows a design of aperiodic reporting of clean and unclean channel feedback information with configurable measurement subframe and configurable reporting subframe for FDD in LTE. An eNB may desire to receive channel feedback information from a UE and may send a channel feedback request to the UE in subframe n. The UE may receive the request and, in response, may determine clean and unclean CQIs, clean and unclean RIs, clean and unclean PMIs, or any combination thereof for subframe n+m and/or other subframes. The UE may then send a report comprising the clean and unclean CQIs, the clean and unclean RIs, the clean and unclean PMIs, or any combination thereof in subframe n+k to the eNB.

LTE Release 8 supports four PUCCH report types that may be used to send different combinations of CQI, RI and PMI. LTE Release 8 also supports different PUCCH reporting modes. For example, PUCCH reporting modes 1-0 and 1-1 may be used to send wideband CQI. PUCCH reporting modes 2-0 and 2-1 may be used to send subband CQI for one or more bandwidth parts (BPs). The PUCCH report types and PUCCH reporting modes in LTE Release 8 are described in 3GPP TS 36.213, entitled "Evolved Universal Terrestrial Radio Access (E-UTRA); Physical layer procedures," which is publicly available.

In another aspect, additional PUCCH report types may be defined to support reporting of clean and unclean channel feedback information. According to certain aspects, one or more PUCCH report types listed in Table 2 may be supported. Other PUCCH report types may also be supported for clean and unclean channel feedback information.

TABLE 2

Additional PUCCH Report Types

| PUCCH Report Type | Reported Info | Description |
| --- | --- | --- |
| 5 | Dual Subband CQIs | Similar to PUCCH report type 1, but two subband CQIs for clean and unclean CQIs are reported. Subband granularity may be different between clean and unclean CQIs. Differential encoding may be used for unclean CQI. |
| 6 | Dual Wideband CQIs/PMI | Similar to PUCCH report type 2, but two wideband CQIs for clean and unclean CQIs (and only one PMI) are reported. Differential encoding may be used for unclean CQI. |
| 7 | Dual RIs | Similar to PUCCH report type 3, but two RIs for clean and unclean RIs are reported. |
| 8 | Dual Wideband CQIs | Similar to PUCCH report type 4, but two wideband CQIs for clean and unclean CQIs are reported. Differential encoding may be used for unclean CQI. |

LTE Release 8 supports six PUCCH formats that may be used to send uplink control information (UCI). These PUCCH formats supported by LTE Release 8 are described in 3GPP TS 36.211, entitled "Evolved Universal Terrestrial Radio Access (E-UTRA); Physical Channels and Modulation," which is publicly available.

According to certain aspects, PUCCH formats 2, 2a and 2b may be used to send reports carrying clean and unclean CQIs. For example, PUCCH format 2 may be used for a CQI/PMI report, or an RI report, or a dual CQI/PMI report, or a dual RI report when not multiplexed with ACK/NACK feedback for HARQ. PUCCH format 2a may be used for a CQI/PMI report, or an RI report, or a dual CQI/PMI report, or a dual RI report when multiplexed with 1-bit ACK/NACK feedback for the normal cyclic prefix. PUCCH format 2b may be used for a CQI/PMI report, or an RI report, or a dual CQI/PMI report, or a dual RI report when multiplexed with 2-bit ACK/NACK feedback for the normal cyclic prefix. PUCCH format 2 may also be used for a CQI/PMI report, or an RI report, or a dual CQI/PMI report, or a dual RI report when multiplexed with ACK/NACK feedback for the extended cyclic prefix.

FIG. 11 illustrates example operations 1100 for reporting channel feedback information. operations 1100 may be performed, for example, by a UE (as described below) or by some other entity. The UE may receive a request for CQI in a first subframe (block 1112). The UE may determine a first CQI for a second subframe having a first offset from the first subframe (block 1114). The UE may send a report comprising the first CQI in a third subframe having a second offset from the first subframe (block 1116). The UE may thereafter receive data transmission sent based on the first CQI (block 1118).

As described above, the first offset (offset m) may be configurable. According to certain aspects, the UE may receive the first offset via upper layer signaling or with the request for CQI. In another design, the UE may determine the first offset by cycling through a range of possible offsets and selecting a different offset for each request for CQI. The first offset may also be determined in other manners.

According to certain aspects, the second offset (offset k) may be fixed. In another design, the second offset may be configurable and may be received by the UE via upper layer signaling or with the request. The second offset may be one of a plurality of possible offsets corresponding to different subframes of one interlace. For example, the second offset may be equal to 4 or 12 when an interlace includes subframes spaced apart by 8 subframes.

According to certain aspects, the UE may determine a second CQI for at least one additional subframe prior to the third subframe. The report may then comprise the first and second CQIs. The second subframe may be allocated to a base station and may have reduced or no interference from at least one interfering base station. The at least one additional subframe may not be allocated to the base station. The first CQI may be a clean CQI, and the second CQI may be an unclean CQI. According to certain aspects, the UE may receive an indication (e.g., via upper layer signaling or with the request for CQI) to report a single CQI for a single subframe or a plurality of CQIs for a plurality of subframes. The UE may determine (i) only the first CQI if the indication indicates to report a single CQI or (ii) the first and second CQIs if the indication indicates to report a plurality of CQIs.

The UE may support MIMO. According to certain aspects, the UE may determine a first RI for the second subframe, and the report may further comprise the first RI. The UE may also determine a PMI for the second subframe, and the report may further comprise the PMI. The UE may further determine a second RI for the at least one additional subframe, and the report may further comprise the second RI. In general, the UE may determine and report one or more CQIs for one or more subframes, one or more RIs for one or more subframes, one or more PMIs for one or more subframes, or any combination thereof.

The UE may receive a downlink grant and the request for CQI in the first subframe (e.g., subframe n). According to certain aspects, the UE may receive data transmission in the first subframe (e.g., subframe n) and may send ACK or NACK for the data transmission in a fourth subframe (e.g., subframe n+4) prior to the third subframe. In another design, the UE may receive data transmission in the first subframe and may send ACK/NACK and the report in the third subframe (e.g., subframe n+12). In yet another design, the UE may receive data transmission in a subframe (e.g., subframe n+8) having a fixed offset from the first subframe and may send ACK/NACK and the report in the third subframe. The UE may also receive data transmission on the downlink and send ACK/NACK on the uplink in other manners.

The UE may receive an uplink grant and the request for CQI in the first subframe (e.g., subframe n). According to certain aspects, the UE may send data transmission in a subframe (e.g., subframe n+4) having a fixed offset from the first subframe and prior to the third subframe. In another design, the UE may send data transmission and the report in the third subframe (e.g., subframe n+12). The UE may also send data transmission on the uplink in other manners.

FIG. 12 illustrates example operations 1200 for receiving channel feedback information. Operations 1200 may be performed by a base station/eNB (as described below) or by some other entity. The base station may send a request for CQI in a first subframe (block 1212). The base station may receive a report comprising a first CQI determined for a second subframe having a first offset from the first subframe (block 1214). The base station may receive the report in a third subframe having a second offset from the first subframe. The base station may thereafter send data transmission based on the first CQI (block 1216).

The first offset (offset m) may be configurable. According to certain aspects, the base station may send the first offset via upper layer signaling or with the request for CQI. In another design, the first offset may be determined by cycling through a range of possible offsets and selecting a different offset for each request for CQI. The first offset may also be determined in other manners.

According to certain aspects, the second offset (offset k) may be fixed. In another design, the second offset may be configurable and may be sent by the base station via upper layer signaling or with the request. The second offset may be one of a plurality of possible offsets (e.g., 4 and 12) corresponding to different subframes of one interlace.

The base station may also obtain other channel feedback information from the report. According to certain aspects, the base station may obtain a second CQI determined for at least one additional subframe prior to the third subframe. The second subframe may be allocated to the base station and may have reduced or no interference from at least one interfering base station. The at least one additional subframe may not be allocated to the base station. The first CQI may be a clean CQI, and the second CQI may be an unclean CQI. According to certain aspects, the base station may send an indication (e.g., via upper layer signaling or with the request for CQI) to report a single CQI for a single subframe or a plurality of CQIs for a plurality of subframes. The base station may receive (i) only the first CQI if the indication indicates to report a single CQI or (ii) the first and second CQIs if the indication indicates to report a plurality of CQIs.

The base station may support MIMO and may obtain MIMO-related channel feedback information from the report. According to certain aspects, the base station may obtain a first RI determined for the second subframe. The base station may also obtain a PMI determined for the second subframe. The base station may also obtain a second RI determined for the at least one additional subframe. In general, the base station may obtain one or more CQIs for one or more subframes, one or more RIs for one or more subframes, one or more PMIs for one or more subframes, or any combination thereof from the report.

The base station may send a downlink grant and the request for CQI in the first subframe (e.g., subframe n). According to certain aspects, the base station may send data transmission in the first subframe (e.g., subframe n) and may receive ACK or NACK for the data transmission in a fourth subframe (e.g., subframe n+4) prior to the third subframe. In another design, the base station may send data transmission in the first subframe and may receive ACK/NACK and the report in the third subframe (e.g., subframe n+12). In yet another design, the base station may send data transmission in a subframe (e.g., subframe n+8) having a fixed offset from the first subframe and may receive ACK/NACK and the report in the third subframe. The base station may also send data transmission on the downlink and receive ACK/NACK on the uplink in other manners.

The base station may send an uplink grant and the request for CQI in the first subframe (e.g., subframe n). According to certain aspects, the base station may receive data transmission in a subframe (e.g., subframe n+4) having a fixed offset from the first subframe and prior to the third subframe. In another design, the base station may receive data transmission and the report in the third subframe (e.g., subframe n+12). The base station may also receive data transmission sent on the uplink in other manners.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving, via radio resource control signaling, channel quality indicator (CQI) reporting configuration information comprising two or more offsets for aperiodic CQI reporting, wherein a first offset of the two or more offsets indicates an offset relative to a subframe carrying a CQI request and a second offset of the two or more offsets indicates when a corresponding CQI report should be sent;
   receiving, via a downlink control information message, a request for aperiodic CQI in a first subframe;
   determining a first CQI for a second subframe having the first offset from the first subframe, wherein the second subframe is allocated to a base station and has reduced or no interference from at least one interfering base station;
   determining a second CQI for at least one additional subframe prior to a third subframe having the second offset from the first subframe, wherein the at least one additional subframe is not allocated to the base station; and sending a report comprising the first and second CQIs in the third subframe.

2. The method of claim 1, wherein the second offset is one of a plurality of possible offsets corresponding to different subframes of one interlace.

3. The method of claim 1, further comprising:
determining a rank indicator (RI) for the second subframe; and
generating the report comprising the first CQI and the RI.

4. The method of claim 1, further comprising:
determining a precoding matrix indicator (PMI) for the second subframe, and wherein the report further comprises the PMI.

5. The method of claim 1, further comprising:
determining a first rank indicator (RI) for the second subframe;
generating the report comprising the first and second CQIs and the first RI.

6. The method of claim 5, further comprising:
determining a second RI for the at least one additional subframe, and wherein the report further comprises the second RI.

7. The method of claim 1, further comprising:
receiving an indication to report a single CQI for a single subframe or a plurality of CQIs for a plurality of subframes, and wherein the second CQI is determined if the indication indicates to report a plurality of CQIs.

8. The method of claim 7, wherein the indication is received via upper layer signaling or with the request for aperiodic CQI.

9. The method of claim 1, further comprising:
receiving data transmission sent based on the first CQI.

10. The method of claim 1, further comprising:
receiving a downlink grant and the request for aperiodic CQI in the first subframe;
receiving data transmission in the first subframe; and
sending acknowledgement (ACK) or negative acknowledgement (NACK) for the data transmission in a fourth subframe prior to the third subframe.

11. The method of claim 1, further comprising:
receiving a downlink grant and the request for aperiodic CQI in the first subframe;
receiving data transmission in the first subframe; and
sending acknowledgement (ACK) or negative acknowledgement (NACK) for the data transmission and the report in the third subframe.

12. The method of claim 1, further comprising:
receiving an uplink grant and the request for aperiodic CQI in the first subframe; and
sending data transmission in a fourth subframe having a fixed offset from the first subframe and prior to the third subframe.

13. The method of claim 1, further comprising:
receiving an uplink grant and the request for aperiodic CQI in the first subframe; and
sending data transmission and the report in the third subframe.

14. A method for wireless communication, comprising:
generating channel quality indicator (CQI) reporting configuration information comprising two or more offsets, wherein a first offset of the two or more offsets indicates an offset relative to a first subframe carrying a CQI request and a second offset of the two or more offsets indicates when a corresponding CQI report should be sent;
transmitting, via radio resource control signaling, the CQI reporting configuration information to a UE;
sending, via a downlink control information message, a request for aperiodic CQI in a first subframe;
receiving a report comprising a first CQI determined for a second subframe having the first offset from the first subframe, the report being received in a third subframe having the second offset from the first subframe, wherein the second subframe is allocated to a base station and has reduced or no interference from at least one interfering base station; and
obtaining from the report a second CQI determined for at least one additional subframe prior to the third subframe, wherein the at least one additional subframe is not allocated to the base station.

15. The method of claim 14, wherein the first offset is determined by cycling through a range of possible offsets and selecting a different offset for each request for aperiodic CQI.

16. The method of claim 14, wherein the second offset is one of a plurality of possible offsets corresponding to different subframes of one interlace.

17. The method of claim 14, further comprising:
obtaining from the report a rank indicator (RI) determined for the second subframe.

18. The method of claim 17, further comprising:
obtaining from the report a precoding matrix indicator (PMI) determined for the second subframe.

19. The method of claim 14, further comprising:
obtaining from the report a first rank indicator (RI) determined for the second subframe.

20. The method of claim 19, further comprising:
obtaining from the report a second RI determined for the at least one additional subframe.

21. The method of claim 14, further comprising:
sending an indication to report a single CQI for a single subframe or a plurality of CQIs for a plurality of subframes, and wherein the second CQI is obtained if the indication indicates to report a plurality of CQIs.

22. The method of claim 14, wherein the indication is sent via upper layer signaling or with the request for aperiodic CQI.

23. The method of claim 20, further comprising:
sending data transmission based on the first CQI.

24. The method of claim 14, further comprising:
sending a downlink grant and the request for aperiodic CQI in the first subframe;
sending data transmission in the first subframe; and
receiving acknowledgement (ACK) or negative acknowledgement (NACK) for the data transmission in a fourth subframe prior to the third subframe.

25. The method of claim 14, further comprising:
sending a downlink grant and the request for aperiodic CQI in the first subframe;
sending data transmission in the first subframe; and
receiving acknowledgement (ACK) or negative acknowledgement (NACK) for the data transmission and the report in the third subframe.

26. The method of claim 14, further comprising:
sending an uplink grant and the request for aperiodic CQI in the first subframe; and
receiving data transmission in a fourth subframe having a fixed offset from the first subframe and prior to the third subframe.

27. The method of claim 14, further comprising:
sending an uplink grant and the request for aperiodic CQI in the first subframe; and
receiving data transmission and the report in the third subframe.

28. An apparatus for wireless communication, comprising:
means for receiving, via radio resource control signaling, channel quality indicator (CQI) reporting configuration information comprising two or more offsets for aperiodic CQI reporting, wherein a first offset of the two or more offsets indicates an offset relative to a subframe carrying a CQI request and a second offset of the two or more offsets indicates when a corresponding CQI report should be sent;
means for receiving, via a downlink control information message, a request for aperiodic CQI in a first subframe;
means for determining a first CQI for a second subframe having the first offset from the first subframe, wherein the second subframe is allocated to a base station and has reduced or no interference from at least one interfering base station;
means for determining a second CQI for at least one additional subframe prior to a third subframe having the second offset from the first subframe, wherein the at least one additional subframe is not allocated to the base station; and
means for sending a report comprising the first and second CQIs in the third subframe.

29. The apparatus of claim 28, wherein the second offset is one of a plurality of possible offsets corresponding to different subframes of one interlace.

30. The apparatus of claim 28, further comprising:
means for determining a rank indicator (RI) for the second subframe; and
means for generating the report comprising the first CQI and the RI.

31. The apparatus of claim 30, further comprising:
means for determining a precoding matrix indicator (PMI) for the second subframe, and wherein the report further comprises the PMI.

32. An apparatus for wireless communication, comprising:
means for generating channel quality indicator (CQI) reporting configuration information comprising two or more offsets, wherein a first offset of the two or more offsets indicates an offset relative to a first subframe carrying a CQI request and a second offset of the two or more offsets indicates when a corresponding CQI report should be sent;
means for transmitting, via radio resource control signaling, the CQI reporting configuration information to a UE;
means for sending, via a downlink control information message, a request for aperiodic CQI in a first subframe;
means for receiving a report comprising a first CQI determined for a second subframe having the first offset from the first subframe, the report being received in a third subframe having the second offset from the first subframe, wherein the second subframe is allocated to a base station and has reduced or no interference from at least one interfering base station; and
means for obtaining from the report a second CQI determined for at least one additional subframe prior to the third subframe, wherein the at least one additional subframe is not allocated to the base station.

33. The apparatus of claim 32, wherein the first offset is determined by cycling through a range of possible offsets and selecting a different offset for each request for aperiodic CQI.

34. The apparatus of claim 32, wherein the second offset is one of a plurality of possible offsets corresponding to different subframes of one interlace.

35. The apparatus of claim 32, further comprising:
means for obtaining from the report a rank indicator (RI) determined for the second subframe.

36. The apparatus of claim 35, further comprising:
means for obtaining from the report a precoding matrix indicator (PMI) determined for the second subframe.

37. An apparatus for wireless communication, comprising:
at least one processor configured to:
receive, via radio resource control signaling, channel quality indicator (CQI) reporting configuration information comprising two or more offsets for aperiodic CQI reporting, wherein a first offset of the two or more offsets indicates an offset relative to a subframe carrying a CQI request and a second offset of the two or more offsets indicates when a corresponding CQI report should be sent,
receive, via a downlink control information message, a request for aperiodic CQI in a first subframe,
determine a first CQI for a second subframe having the first offset from the first subframe, wherein the second subframe is allocated to a base station and has reduced or no interference from at least one interfering base station,
determine a second CQI for at least one additional subframe prior to a third subframe having the second offset from the first subframe, wherein the at least one additional subframe is not allocated to the base station, and
send a report comprising the first and second CQIs in the third subframe; and
a memory coupled with the at least one processor.

38. An apparatus for wireless communication, comprising:
at least one processor configured to:
generate channel quality indicator (CQI) reporting configuration information comprising two or more offsets, wherein a first offset of the two or more offsets indicates an offset relative to a first subframe carrying a CQI request and a second offset of the two or more offsets indicates when a corresponding CQI report should be sent,
transmit, via radio resource control signaling, the CQI reporting configuration information to a UE,
send, via a downlink control information message, a request for aperiodic CQI in a first subframe,
receive a report comprising a first CQI determined for a second subframe having the first offset from the first subframe, the report being received in a third subframe having the second offset from the first subframe, wherein the second subframe is allocated to a base station and has reduced or no interference from at least one interfering base station, and
obtain from the report a second CQI determined for at least one additional subframe prior to the third subframe, wherein the at least one additional subframe is not allocated to the base station; and
a memory coupled with the at least one processor.

39. A computer program product comprising a non-transitory computer readable medium with instructions stored thereon, the instructions executable by one or more processors for:
receiving, via radio resource control signaling, channel quality indicator (CQI) reporting configuration information comprising two or more offsets for aperiodic CQI reporting, wherein a first offset of the two or more offsets indicates an offset relative to a subframe carrying a CQI request and a second offset of the two or more offsets indicates when a corresponding CQI report should be sent;

receiving, via a downlink control information message, a request for aperiodic CQI in a first subframe;

determining a first CQI for a second subframe having the first offset from the first subframe, wherein the second subframe is allocated to a base station and has reduced or no interference from at least one interfering base station;

determining a second CQI for at least one additional subframe prior to a third subframe having the second offset from the first subframe, wherein the at least one additional subframe is not allocated to the base station; and sending a report comprising the first and second CQIs in the third subframe.

40. A computer program product comprising a non-transitory computer readable medium with instructions stored thereon, the instructions executable by one or more processors for:

generating channel quality indicator (CQI) reporting configuration information comprising two or more offsets, wherein a first offset of the two or more offsets indicates an offset relative to a first subframe carrying a CQI request and a second offset of the two or more offsets indicates when a corresponding CQI report should be sent;

transmitting, via radio resource control signaling, the CQI reporting configuration information to a UE;

sending, via a downlink control information message, a request for aperiodic CQI in a first subframe;

receiving a report comprising a first CQI determined for a second subframe having a first offset from the first subframe, the report being received in a third subframe having a second offset from the first subframe, wherein the second subframe is allocated to a base station and has reduced or no interference from at least one interfering base station; and obtaining from the report a second CQI determined for at least one additional subframe prior to the third subframe, wherein the at least one additional subframe is not allocated to the base station.

41. A method for wireless communication at a user equipment (UE), comprising:

receiving resource partitioning information for channel quality indicator (CQI) reporting, the resource partitioning information identifying a first set of subframes associated with a first channel state information (CSI) condition for a serving base station and a second set of subframes associated with a second CSI condition for the serving base station;

receiving a first request for aperiodic CQI;

reporting a first CQI responsive to the first request for aperiodic CQI, the first CQI comprising CQI for the first CSI condition based on a determination that the first request for aperiodic CQI is associated with the first set of subframes;

receiving a second request for aperiodic CQI; and reporting a second CQI responsive to the second request for aperiodic CQI, the second CQI comprising CQI for the second CSI condition based on a determination that the second request for aperiodic CQI is associated with the second set of subframes.

42. The method of claim 41, wherein the resource partitioning information comprises a plurality of interlaces comprising any of a set of subframes reserved for the serving base station, a set of subframes allocated to at least one non-serving base station, a set of subframes usable by any base stations, a set of subframes being adaptively allocated to any base stations, or combinations thereof.

43. The method of claim 42, wherein the subframes of the set of subframes reserved for the serving base station are associated with the first CSI condition for the serving base station and the subframes of the set of subframes allocated to the at least one non-serving base station are associated with the second CSI condition for the serving base station.

44. The method of claim 42, further comprising:

identifying the first set of subframes, the first set of subframes comprising the set of subframes reserved for the serving base station;

determining the first CQI for the first set of subframes;

identifying the second set of subframes, the second set of subframes comprising the set of subframes allocated to at least one non-serving base station; and determining the second CQI for the second set of subframes.

45. The method of claim 41, wherein corresponding reference resources for the first CQI and the second CQI comprise subframes in which the respective CQI request is received.

46. The method of claim 45, wherein an offset between a subframe in which a respective request for aperiodic CQI is received and a subframe in which a corresponding CQI is reported comprises a fixed offset.

47. A method for wireless communication at a base station, comprising:

identifying a first set of subframes associated with a first channel state information (CSI) condition for the base station and a second set of subframes associated with a second CSI condition for the base station;

sending, to one or more user equipments (UEs) served by the base station, resource partitioning information identifying the first and second sets of subframes;

sending a first request for aperiodic CQI corresponding to the first CSI condition to a first UE of the one or more UEs;

receiving a first aperiodic CQI corresponding to the first CSI condition for the first UE;

sending a second request for aperiodic CQI corresponding to the second CSI condition to the first UE;

receiving a second aperiodic CQI corresponding to the second CSI condition for the first UE; and sending a data transmission to the first UE based on one or more of the first aperiodic CQI or the second aperiodic CQI.

48. The method of claim 47, wherein the resource partitioning information comprises a plurality of interlaces comprising any of a set of subframes reserved for the base station, a set of subframes allocated to non-serving base stations, a set of subframes usable by any base stations, a set of subframes adaptively allocated to any base stations, or combinations thereof.

49. The method of claim 48, wherein the subframes of the set of subframes reserved for the base station are associated with the first CSI condition for the base station and the subframes of the set of subframes allocated to non-serving base stations are associated with the second CSI condition for the base station.

50. The method of claim 47, wherein corresponding reference resources for the first aperiodic CQI and the second aperiodic CQI comprise subframes in which the respective aperiodic CQI request is sent.

51. The method of claim 50, wherein an offset between a subframe in which a respective request for aperiodic CQI is sent and a subframe in which a corresponding aperiodic CQI is received comprises a fixed offset.

52. An apparatus for wireless communication at a user equipment (UE), comprising:
means for receiving resource partitioning information for channel quality indicator (CQI) reporting, the resource partitioning information identifying a first set of subframes associated with a first channel state information (CSI) condition for a serving base station and a second set of subframes associated with a second CSI condition for the serving base station;
means for receiving a first request for aperiodic CQI;
means for reporting a first CQI responsive to the first request for aperiodic CQI, the first CQI comprising CQI for the first CSI condition based on a determination that the first request for aperiodic CQI is associated with the first set of subframes;
means for receiving a second request for aperiodic CQI; and
means for reporting a second CQI responsive to the second request for aperiodic CQI, the second CQI comprising CQI for the second CSI condition based on a determination that the second request for aperiodic CQI is associated with the second set of subframes.

53. The apparatus of claim 52, wherein the resource partitioning information comprises a plurality of interlaces comprising any of a set of subframes reserved for the serving base station, a set of subframes allocated to at least one non-serving base station, a set of subframes usable by any base stations, a set of subframes being adaptively allocated to any base stations, or combinations thereof.

54. The apparatus of claim 53, further comprising:
means for identifying the first set of subframes, the first set of subframes comprising the set of subframes reserved for the serving base station;
means for determining the first CQI for the first set of subframes;
means for identifying the second set of subframes, the second set of subframes comprising the set of subframes allocated to at least one non-serving base station; and
means for determining the second CQI for the second set of subframes.

55. An apparatus for wireless communication at a base station, comprising:
means for identifying a first set of subframes associated with a first channel state information (CSI) condition for the base station and a second set of subframes associated with a second CSI condition for the base station;
means for sending, to one or more user equipments (UEs) served by the base station, resource partitioning information identifying the first and second sets of subframes;
means for sending a first request for aperiodic CQI corresponding to the first CSI condition to a first UE of the one or more UEs;
means for receiving a first aperiodic CQI corresponding to the first CSI condition for the first UE;
means for sending a second request for aperiodic CQI corresponding to the second CSI condition to the first UE;
means for receiving a second aperiodic CQI corresponding to the second CSI condition for the first UE; and
means for sending a data transmission to the first UE based on one or more of the first aperiodic CQI or the second aperiodic CQI.

56. The apparatus of claim 55, wherein the resource partitioning information comprises a plurality of interlaces comprising any of a set of subframes reserved for the base station, a set of subframes allocated to non-serving base stations, a set of subframes usable by any base stations, a set of subframes adaptively allocated to any base stations, or combinations thereof.

57. An apparatus for wireless communication at a user equipment (UE), comprising:
a processor; and
memory in electronic communication with the processor, the memory embodying instructions, the instructions being executable by the processor to:
receive resource partitioning information for channel quality indicator (CQI) reporting, the resource partitioning information identifying a first set of subframes associated with a first channel state information (CSI) condition for a serving base station and a second set of subframes associated with a second CSI condition for the serving base station;
receive a first request for aperiodic CQI;
report a first CQI responsive to the first request for aperiodic CQI, the first CQI comprising CQI for the first CSI condition based on a determination that the first request for aperiodic CQI is associated with the first set of subframes;
receive a second request for aperiodic CQI; and
report a second CQI responsive to the second request for aperiodic CQI, the second CQI comprising CQI for the second CSI condition based on a determination that the second request for aperiodic CQI is associated with the second set of subframes.

58. The apparatus of claim 57, wherein the resource partitioning information comprises a plurality of interlaces comprising any of a set of subframes reserved for the serving base station, a set of subframes allocated to at least one non-serving base station, a set of subframes usable by any base stations, a set of subframes being adaptively allocated to any base stations, or combinations thereof.

59. The apparatus of claim 58, wherein the subframes of the set of subframes reserved for the serving base station are associated with the first CSI condition for the serving base station and the subframes of the set of subframes allocated to the at least one non-serving base station are associated with the second CSI condition for the serving base station.

60. The apparatus of claim 58, wherein the memory further comprises instructions being executable by the processor to:
identify the first set of subframes, the first set of subframes comprising the set of subframes reserved for the serving base station;
determine the first CQI for the first set of subframes;
identify the second set of subframes, the second set of subframes comprising the set of subframes allocated to the at least one non-serving base station; and
determine the second CQI for the second set of subframes.

61. An apparatus for wireless communication at a base station, comprising:
a processor; and
memory in electronic communication with the processor, the memory embodying instructions, the instructions being executable by the processor to:
identify a first set of subframes associated with a first channel state information (CSI) condition for the base station and a second set of subframes associated with a second CSI condition for the base station;
send, to one or more user equipments (UEs) served by the base station, resource partitioning information identifying the first and second sets of subframes;
send a first request for aperiodic CQI corresponding to the first CSI condition to a first UE of the one or more UEs;

receive a first aperiodic CQI corresponding to the first CSI condition for the first UE;

send a second request for aperiodic CQI corresponding to the second CSI condition to the first UE;

receive a second aperiodic CQI corresponding to the second CSI condition for the first UE; and send a data transmission to the first UE based on one or more of the first aperiodic CQI or the second aperiodic CQI.

62. The method of claim 61, wherein the resource partitioning information comprises a plurality of interlaces comprising any of a set of subframes reserved for the base station, a set of subframes allocated to non-serving base stations, a set of subframes usable by any base stations, a set of subframes adaptively allocated to any base stations, or combinations thereof.

63. The method of claim 62, wherein the subframes of the set of subframes reserved for the base station are associated with the first CSI condition for the base station and the subframes of the set of subframes allocated to non-serving base stations are associated with the second CSI condition for the base station.

64. A non-transitory computer-readable medium for wireless communication at a user equipment (UE), the non-transitory computer-readable medium storing computer-executable code for:

receiving resource partitioning information for channel quality indicator (CQI) reporting, the resource partitioning information identifying a first set of subframes associated with a first channel state information (CSI) condition for a serving base station and a second set of subframes associated with a second CSI condition for the serving base station;

receiving a first request for aperiodic CQI;

reporting a first CQI responsive to the first request for aperiodic CQI, the first CQI comprising CQI for the first CSI condition based on a determination that the first request for aperiodic CQI is associated with the first set of subframes;

receiving a second request for aperiodic CQI; and reporting a second CQI responsive to the second request for aperiodic CQI, the second CQI comprising CQI for the second CSI condition based on a determination that the second request for aperiodic CQI is associated with the second set of subframes.

65. A non-transitory computer-readable medium for wireless communication at a base station, the non-transitory computer-readable medium storing computer-executable code for:

identifying a first set of subframes associated with a first channel state information (CSI) condition for the base station and a second set of subframes associated with a second CSI condition for the base station;

sending, to one or more user equipments (UEs) served by the base station, resource partitioning information identifying the first and second sets of subframes;

sending a first request for aperiodic CQI corresponding to the first CSI condition to a first UE of the one or more UEs;

receiving a first aperiodic CQI corresponding to the first CSI condition for the first UE;

sending a second request for aperiodic CQI corresponding to the second CSI condition to the first UE;

receiving a second aperiodic CQI corresponding to the second CSI condition for the first UE; and sending a data transmission to the first UE based on one or more of the first aperiodic CQI or the second aperiodic CQI.

* * * * *